(12) United States Patent
Bittar (10) Patent No.: US 6,191,586 B1
(45) Date of Patent: Feb. 20, 2001

(54) METHOD AND APPARATUS FOR AZIMUTHAL ELECTROMAGNETIC WELL LOGGING USING SHIELDED ANTENNAS

(75) Inventor: Michael S. Bittar, Houston, TX (US)

(73) Assignee: Dresser Industries, Inc., Dallas, TX (US)

( * ) Notice: Under 35 U.S.C. 154(b), the term of this patent shall be extended for 0 days.

(21) Appl. No.: 09/095,523

(22) Filed: Jun. 10, 1998

(51) Int. Cl.$^7$ .................................................. G01V 3/28
(52) U.S. Cl. .......................................... 324/339; 324/338
(58) Field of Search .................................. 324/338, 339, 324/343, 346, 356, 369, 375, 366, 340, 341, 342, 344, 345, 347

(56) References Cited

U.S. PATENT DOCUMENTS

| | | | |
|---|---|---|---|
| 3,551,797 | * 12/1970 | Gouilloud | 324/6 |
| 4,209,747 | * 6/1980 | Huchital | 324/338 |
| 4,511,843 | 4/1985 | Thoraval | 324/338 |
| 4,514,693 | 4/1985 | Meador | 324/338 |
| 4,536,714 | 8/1985 | Clark | 324/338 |
| 4,651,101 | 3/1987 | Barber et al. | 324/339 |
| 4,697,190 | 9/1987 | Oswald | 343/719 |
| 4,785,247 | 11/1988 | Meador et al. | 324/338 |
| 4,808,929 | 2/1989 | Oldigs | 324/339 |
| 4,940,943 | 7/1990 | Bartel et al. | 324/338 |
| 4,949,045 | 8/1990 | Clark et al. | 324/338 |
| 5,205,167 | * 4/1993 | Gartner et al. | 73/155 |
| 5,278,507 | 1/1994 | Bartel et al. | 324/338 |
| 5,389,881 | 2/1995 | Bittar et al. | 324/338 |
| 5,508,616 | 4/1996 | Sato et al. | 324/343 |
| 5,530,358 | 6/1996 | Wisler et al. | 324/338 |
| 5,563,512 | * 10/1996 | Mumby | 324/339 |
| 5,631,563 | 5/1997 | Moriarty | 324/338 |

* cited by examiner

Primary Examiner—Jay Patidar
Assistant Examiner—Henry S. Andersen
(74) Attorney, Agent, or Firm—Cox & Smith Incorporated (57) ABSTRACT

An apparatus and method for implementing azimuthal capabilities on electromagnetic wave resistivity well logging tools. The apparatus comprises a structurally simple antenna shield positioned around either the transmitting or receiving antennas, or both, positioned on the well logging tool on the drill string. The shields partially surround the tool and provide an electromagnetic barrier for either the transmission or reception of electromagnetic waves, as the case may be. Positioned on the shield are appropriately placed and sized windows through which electromagnetic waves may either be transmitted or received, depending upon the function of the antenna that the shield surrounds. Variations in window dimensions allow optimization of the device for use in conjunction with a variety of formations and a variety of drill mud characteristics.

18 Claims, 12 Drawing Sheets

METHOD AND APPARATUS FOR AZIMUTHAL ELECTROMAGNETIC WELL LOGGING USING SHIELDED ANTENNAS

BACKGROUND OF THE INVENTION

1. Field of the Invention

The present invention relates generally to electromagnetic-based well logging systems. The present invention relates more specifically to a method and apparatus for making electromagnetic wave resistivity well logging tools azimuthally sensitive through the use of partially shielded antennas.

2. Description of the Prior Art

Among the various types of well logging systems and methods are those based upon the transmission, propagation, and reception of electromagnetic waves within the formation surrounding a borehole. A great deal of information can be obtained about the characteristics of the surrounding formation by directing electrical currents and electromagnetic fields into the formation and detecting changes in those currents and fields after interaction with the formation.

In instances where electrically conductive drilling mud is utilized within a borehole, a direct current measurement of the resistivity of the surrounding formation can be achieved. Alternatively, static and dynamic electromagnetic fields can be generated from a drill string into the surrounding formation, even when the drilling mud is not conductive, in a manner that permits the detection and measurement of changes in the electromagnetic field brought about by the surrounding formation. Various induction well logging techniques generate magnetic fields in the surrounding formation which are modified by the conductivity and magnetic permeability of the formation. The changes in the magnetic field brought about by the formation can then be detected by additional induction coils positioned on the drill string.

In the process of electromagnetic wave resistivity well logging, it is often desirable to be able to measure formation resistivity at different radial distances from the borehole. This process of measuring resistivity as a function of radial distance constitutes making such measurements at different "depths" of investigation. Various attempts in the past have been made to produce resistivity logs that distinguish resistivity at various radial depths from the borehole.

U.S. Pat. No. 5,389,881, issued to Bittar et al. on Feb. 14, 1995, and commonly owned by the Assignee of the present application, entitled Well Logging Method and Apparatus Involving Electromagnetic Wave Propagation Providing Variable Depth of Investigation by Combining Phase Angle and Amplitude Attenuation, discloses one such effort. This patent describes a number of improvements directed toward accurately identifying resistivity values at variable depths from the borehole using electromagnetic well logging methods. In addition, this patent describes the general state of the art and identifies various other patents that attempt to improve the quantitative measurement characteristics of electromagnetic well logging systems.

Other efforts to provide variable depth measurements include; U.S. Pat. No. 5,278,507, issued to Bartel et al. on Jan. 11, 1994, entitled Well Logging Method and Apparatus Providing Multiple Depths of Investigation Using Multiple Transmitters and Single Receiver Pairs Having Depth of Investigation Independent of Formation Resistivity.

Various other issued patents describe attempts to improve the data acquired by electromagnetic well logging systems through efforts to eliminate spurious and unwanted electromagnetic interferences. Most of these attempts involve structural efforts to shield or orient antennas in such a way that only those electromagnetic field variations of interest are transmitted and/or detected. Examples of such patents include; U.S. Pat. No. 4,536,714, issued to Clark on Aug. 20, 1985, entitled Shields for Antennas of Borehole Logging Devices; and U.S. Pat. No. 5,530,358, issued to Wisler et al. on Jun. 25, 1996, entitled Method and Apparatus for Measurement-While-Drilling Utilizing Improved Antennas. Each of these patents, and others in the same field, are directed to radial arrays of shields that effectively act as "polarizers" for the electromagnetic waves transmitted and detected by the drill string logging devices. Basically these shielding attempts establish slots around the antennas that are oriented parallel with the axis of the drill string in a manner that eliminates or reduces transverse magnetic mode noise. In this manner more specific variations in the electromagnetic field can be detected and measured.

Other patents along this same line include U.S. Pat. No. 4,785,247, issued to Meador et al. on Nov. 15, 1988, entitled Drill Stem Logging With Electromagnetic Waves and Electrostatically-Shielded and Inductively-Coupled Transmitter and Receiver Elements; U.S. Pat. No. 4,514,693, issued to Meador on Apr. 30, 1985, entitled Dielectric Well Logging System With Electrostatically-Shielded Coils; U.S. Pat. No. 4,949,045, issued to Clark et al. on Aug. 14, 1990, entitled Well Logging Apparatus Having a Cylindrical Housing With Antennas Formed in Recesses and Covered With a Waterproof Rubber Layer; U.S. Pat. No. 4,651,101, issued to Barber et al. on Mar. 17, 1987, entitled Induction Logging Sonde With Metallic Support; and U.S. Pat. No. 4,808,929, issued to Oldigs on Feb. 28, 1989, entitled Shielded Induction Sensor for Well Logging.

Still further attempts in the field are directed towards providing structural integrity to antenna coils positioned on drill strings for both wireline and measurement-while-drilling applications. Included among these are; U.S. Pat. No. 5,631,563, issued to Moriarty on May 20, 1997, entitled Resistivity Antenna Shield, Wear Band and Stabilizer Assembly for Measuring-While-Drilling Tool; U.S. Pat. No. 5,563,512, issued to Mumby on Oct. 8, 1996, entitled Well Logging Apparatus Having a Removable Sleeve for Sealing and Protecting Multiple Antenna Arrays; U.S. Pat. No. 4,511,843, issued to Thoraval on Apr. 16, 1985, entitled Electromagnetic Logging Sonde Having Improved Housing; and U.S. Pat. No. 4,940,943, issued to Bartel et al., entitled Method and Apparatus for Optimizing the Reception Pattern of the Antenna of a Propagating Electromagnetic Wave Logging Tool.

Finally, there have been a few efforts in the prior art to make electromagnetic well logging systems directional in their investigation. Heretofore, electromagnetic well logging systems have only been able to identify formation characteristics that vary with a first depth dimension (associated with a distance below the surface) and a second depth dimension (associated with a distance radially from the drill string). Heretofore, it has not been possible to distinguish formation characteristics on one side of the drill string from formation characteristics on an opposite side of the drill string at the same depth and distance into the formation. U.S. Pat. No. 4,697,190, issued to Oswald, entitled Borehole Located Directional Antennae Means for Electromagnetic Sensing Systems describes a modest attempt at creating a directional antenna for an electromagnetic sensing system for use in a borehole environment. This earlier attempt describes a V-shaped antenna with a metallic backing intended to direct the electromagnetic waves out from the axis of the drill string. The Oswald device, however, suffers both from complexity and fragility that prohibit its use and application in most borehole drilling environments. Other attempts involve complex coil positioning systems that angle the electromagnetic field transmitters and receivers to provide directional sensitivity. An example of this latter approach can be found in U.S. Pat. No. 5,508,616, issued to Sato et al. on Apr. 16, 1996, entitled Apparatus and Method for Determining Parameters of Formations Surrounding a Borehole in a Preselected Direction.

Efforts in the past to provide a directional capability to electromagnetic based well logging systems have generally been unable to provide systems capable of operation in MWD applications. Even where such systems have been developed for wireline based well logging applications, their complexity leaves them easily damaged and their inaccuracy makes their practical use questionable. In addition, efforts in the past to provide directional sensitivity to electromagnetic well logging systems have generally been unable to combine such abilities with other improvements of the type described above for radial depth measurements.

It would be desirable, therefore, to create and implement a structure and process that allows an electromagnetic wave resistivity logging tool to incorporate a directional parameter to permit the investigation of a formation in a specific radial direction within the borehole. It would be desirable for such a system to be capable of implementation in either a wireline or MWD application. It would further be desirable if such a device were structurally simple and easy to implement on conventional electromagnetic logging tools without the necessity of designing and creating an entirely new logging tool. It would be important for such a device to be versatile in its design and application so as to be useful in a variety of formations and a variety of mud conductivities.

It would further be desirable if a directional electromagnetic well logging tool could operate by both scanning all directions at a specific depth of investigation and by scanning in a single direction at a variety of depth investigations.

SUMMARY OF THE INVENTION

It is therefore an object of the present invention to provide a method and apparatus for adding a directional parameter to the various other investigation parameters associated with electromagnetic based well logging systems.

It is a further object of the present invention to provide a method and apparatus for the azimuthal implementation of electromagnetic well logging systems that is capable of operation under both wireline and MWD applications.

It is a further object of the present invention to provide an apparatus for azimuthal electromagnetic wave well logging that is structurally simple and thereby resistant to damage during operation.

It is a further object of the present invention to provide a method for azimuthal well logging using electromagnetic wave based tools that provides a log of formation resistivity in every direction at a specific depth in the formation.

It is a further object of the present invention to provide a method for azimuthal well logging using electromagnetic based tools that can acquire data for formation resistivity in a single direction at a variety of formation depths.

It is a further object of the present invention to provide a method and apparatus for azimuthal well logging using electromagnetic wave based tools that can easily be implemented on systems already designed to investigate the formation at a plurality of radial depths from the drill string.

It is a further object of the present invention to provide a method and apparatus for azimuthal electromagnetic wave resistivity well logging that remains sensitive to various depths of investigation carried out by existing tools and methods.

In fulfillment of these and other objectives, the present invention provides an apparatus and method for implementing azimuthal capabilities on existing electromagnetic wave resistivity well logging tools. The apparatus comprises a structurally simple antenna shield positioned around either the transmitting or receiving antennas, or both, positioned on the well logging tool on the drill string. The shields cylindrically surround the tool and provide an electromagnetic barrier for either the transmission or reception of electromagnetic waves, as the case may be. Positioned on the shield are appropriately placed and sized windows through which electromagnetic waves may either be transmitted or received, depending upon the function of the antenna that the shield surrounds. Variations in window dimensions allow optimization of the device for use in conjunction with a variety of formations and a variety of drill mud characteristics.

Other objects and features of the present invention will be discerned from a more detailed reading of the following description, and a consideration of the drawings appended, and the claims that follow therefrom.

BRIEF DESCRIPTION OF THE DRAWINGS

The features believed characteristic of the present invention are set forth specifically in the claims that follow. The invention itself, however, as well as the preferred embodiment, further objectives, and further advantages, are best understood by reference to the following detailed description of an illustrative embodiment, in conjunction with the accompanying drawings wherein:

FIG. 2b is a simplified cross-sectional view of the implementation of the present invention as shown in FIG. 2a.

DETAILED DESCRIPTION OF THE PREFERRED EMBODIMENT

Figure 1:
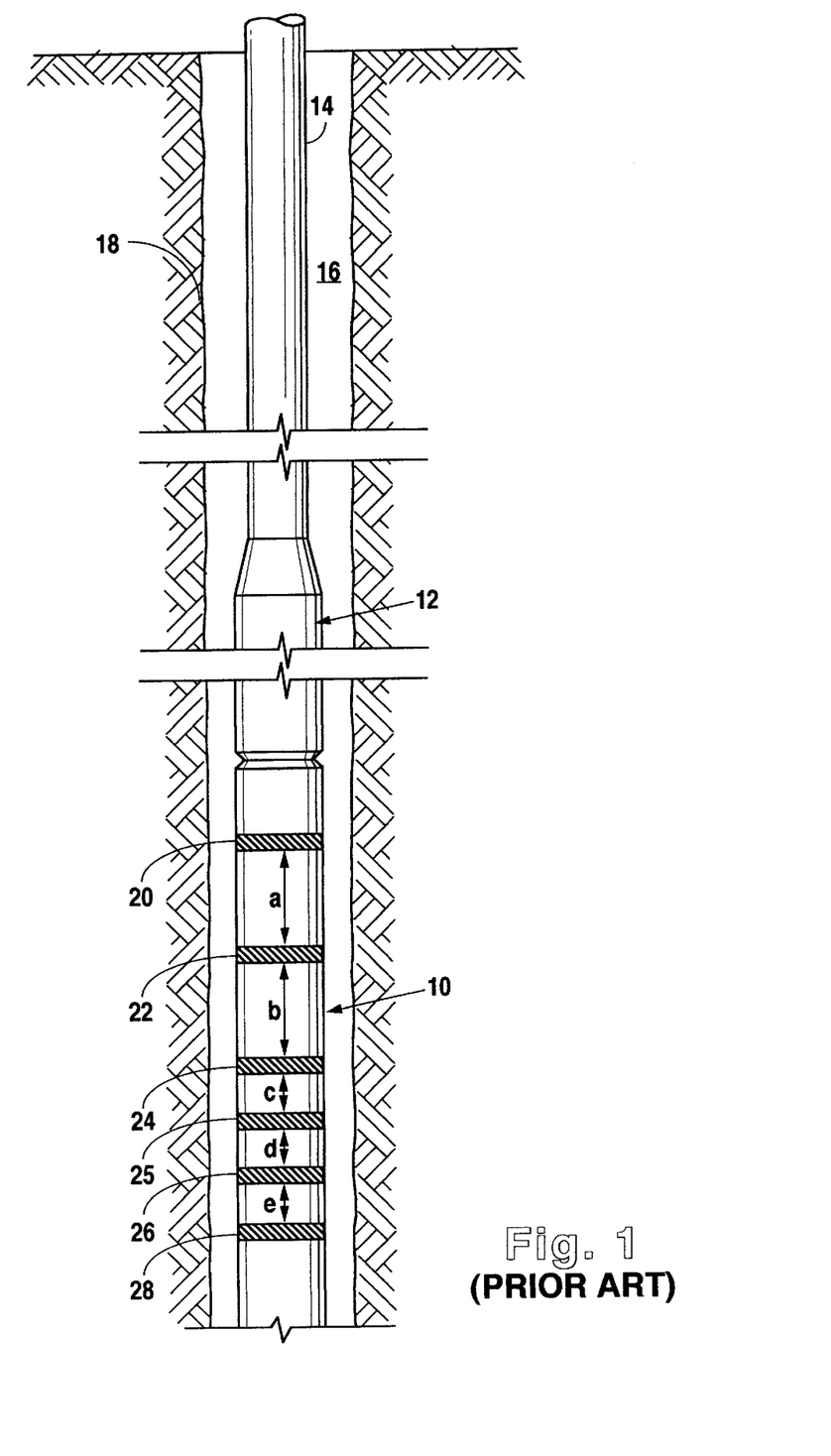
FIG. 1 is a simplified view of a drill string and an MWD tool of the prior art positioned thereon, suitable for use in association with the present invention.

FIG. 1 discloses a typical drill string (14) descending into a borehole (16) within surrounding formation (18). Associated with drill string (14) are a plurality of drill collars (12) which, in at least one instance, serve to position logging tool (10), which is the subject of the present invention. Associated with a typical electromagnetic wave resistivity well logging tool are a plurality of transmitters (20), (22), (24) and (25). Also associated with tool (10) are a plurality of receivers (26) and (28).

As is well known in the art and as is conventional for electromagnetic wave resistivity type tools, the transmitters and receivers are wire coils positioned in planes perpendicular to a longitudinal axis of the drill string. In most instances, these wire coils are wound about recesses or other geometric enclosures on the drill string.

Multiple transmitters are utilized in situations where, for example, different transmitter frequencies are desired. In most prior art cases, each of the transmitter and receiving coils are covered over with non-conductive materials designed to prevent damage to the coils but to allow the easy transmission and reception of electromagnetic waves therethrough.

Tool (10) shown in FIG. 1 is an example of an electromagnetic wave resistivity well logging tool suitable for implementation with the present invention. The tool shown is representative of the EWR-Phase 4™ tool produced by the assignee of the present invention. This tool incorporates two receivers (26) and (28), generally described as "near" and "far" receivers respectively. The measuring point for the tool is defined along a line midway between the two receivers.

The transmitters in tool (10) include a 1 MHz transmitter (20) and three 2 MHz transmitters (22), (24) and (25). Receivers (26) and (28) are spaced 6 inches apart (dimension e). Transmitter (25) is spaced 6 inches from receiver (26) (dimension d). Transmitters (24) and (25) are spaced 6 inches apart (dimension c). Transmitters (22) and (24) are spaced 12 inches apart (dimension b). Finally, transmitters (20) and (22) are spaced 12 inches apart (dimension a).

Various combinations of the transmitters and receivers described above permit a variety of depths of investigation into the formation surrounding the borehole. Each transmitter may operate in conjunction with each of the two receivers to provide a specific depth of investigation. For example, an extra shallow depth involves the use of transmitter (25) in conjunction with receivers (26) and (28). This places the transmitter at a displacement of 6 inches from the first receiver and 12 inches from the second receiver to provide phase measurements. A shallow depth investigation may be carried using transmitter (24) which is positioned 12 inches from the first receiver and 18 inches from the second receiver. A medium depth investigation may be carried out using transmitter (22) which is displaced 24 inches from the first receiver and 30 inches from the second receiver. Finally, a deep depth of investigation may be carried out using transmitter (20) which is displaced 36 inches from the first receiver and 42 inches from the second receiver.

These various combinations of transmitters and receivers permit the typical electromagnetic wave resistivity well logging tool to measure the resistivity of the surrounding formation by detecting phase changes and signal attenuations.

It is understood that logging tool (10), as shown in FIG. 1, also incorporates the necessary electronic circuitry for processing the signals received by receivers (26) and (28), and when necessary, controlling the transmission of signals from transmitters (20), (22), (24), and (25). In addition, the necessary circuitry for converting the received signals into data indicative of the formation characteristics as a function of both radial depth and depth in the borehole, are included. Finally, the necessary communications circuitry for either storing the logged data or transmitting it to the surface by conventional telemetry methods would also be included within tool (10).

Figure 2A:
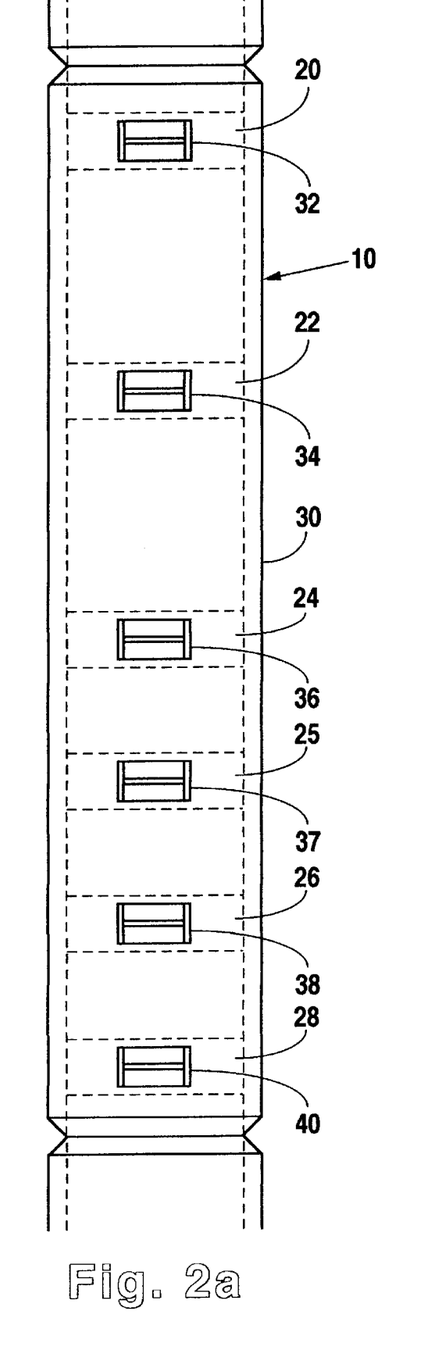
FIG. 2a is a detailed profile view of an implementation of the present invention on the drill string tool structure shown in FIG. 1.
Figure 2B:
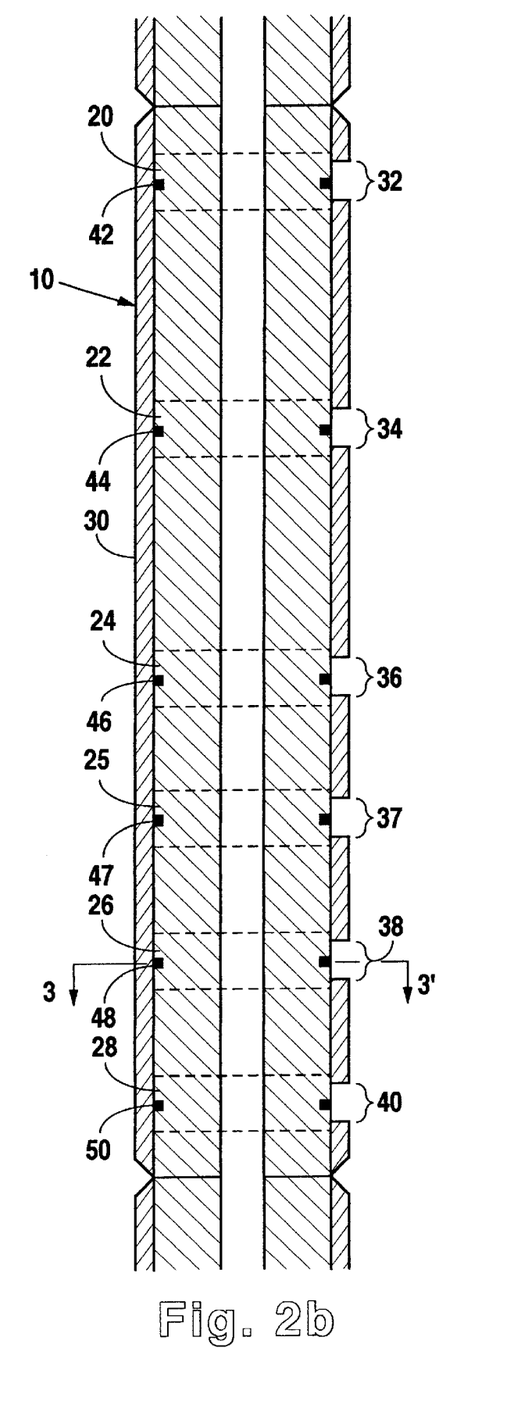

Reference is now made to FIGS. 2a and 2b for a more detailed description of the structures of the present invention and their application in association with the basic tool described in FIG. 1. FIG. 2a shows in profile tool section (10) with metal shield (30) cylindrically surrounding both transmission antennas (20), (22), (24), and (25) and receiving antennas (26) and (28). In the preferred embodiment metal shield (30) is essentially a wear band with open windows appropriately positioned on it. It is also possible to fabricate a drill collar with an open window (or windows) that is positioned to surround the antennas of concern. Any structure that creates a defined barrier to the transmission/reception of electromagnetic waves could serve as an effective shield as long as it can withstand the borehole environment.

Windows (32), (34), (36), and (37) permit the transmission of electromagnetic waves from transmitting antennas (20), (22), (24), and (25), respectively. The geometry of windows (32), (34), (36) and (37), as described in more detail below, in part determines the propagation characteristics of the electromagnetic waves transmitted from tool (10).

In like fashion, windows (38) and (40) are appropriately positioned in metal shield (30) over receiving antennas (26) and (28) in a direction coincident (in most applications) with the windows associated with the transmitting coils.

Even though the geometry of the windows shown in FIG. 2a are similar for each of the transmitting and receiving coils, it is understood that variations in this geometry, and in fact alternate use of shielded and unshielded antennas, is a component of the present invention and may be applicable in accordance with the environment within which the tool is utilized. For example, a particular formation may lend itself to the use of unshielded transmitters in conjunction with partially shielded receiving coils. Or the converse might be true wherein receiving coils remain unshielded while transmission coils are partially shielded. In any case, the embodiment shown in FIG. 2a is intended to be generally descriptive of the structure of the device of the present invention.

Reference is now made to FIG. 2b for a detailed description of the internal structures of tool (10) as generally described in FIG. 2a. The cross-sectional view in FIG. 2b shows the placement of coils (42), (44), (46), and (47) within transmitting antennas (20), (22), (24), and (25). Likewise, coils (48) and (50) are shown in cross-section as they are positioned within receiving antennas (26) and (28). The appropriate wiring and electronic circuitry commonly associated with such electromagnetic well logging are not shown for clarity.

Metal shield (30), also shown in cross-section, is solid and shields each of the antennas on a majority of tool (10). On the one side of tool (10) associated with the investigative direction, windows (32), (34), (36), and (37) are shown appropriately positioned to permit the passage of electromagnetic waves from transmitting antennas (20), (22), (24), and (25), by way of coils (42), (44), (46), and (47). Likewise, windows (38) and (40) are appropriately positioned over coils (48) and (50) associated with receiving antennas (26) and (28) to receive or detect electromagnetic waves and/or field fluctuations.

Figure 3A:
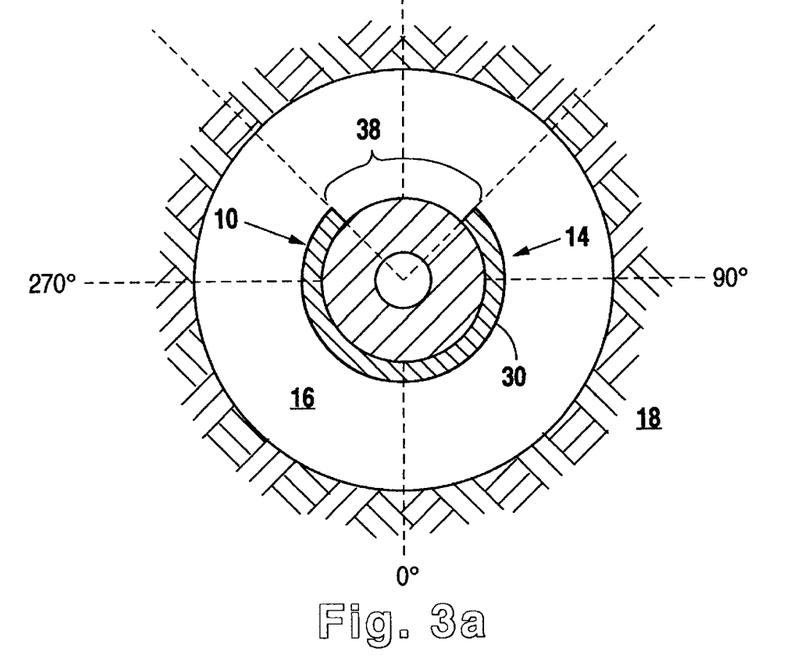
FIG. 3a is a cross-sectional view of the drill string tool in position within a borehole taken along line 3–3' shown in FIG. 2b.

FIG. 3a shows in schematic detail the cross-sectional structure of tool (10) taken along line 3–3' shown in FIG. 2b. This cross-sectional view of tool (10) in place within borehole (16) discloses the radial limitations of the window and the propagation or reception characteristics associated therewith. In FIG. 3a formation (18) surrounds borehole (16) within which is positioned drill string (14). The section shown in FIG. 3a of drill string (14) encompasses a portion of tool (10) wherein metal shield (30) nearly surrounds the tool. Window (38) in this example is positioned over coil (48) in receiver antenna (26). In this case window (38) has a 90° opening as measured by the internal angle centered on the axis of drill string (14). A 90° window results in a propagation or reception pattern (depending upon the antenna being a transmitting or a receiving antenna) equivalent to 25% of the possible 360° reception or transmission pattern. Variations in the window geometry as described in more detail below permit optimization of the present invention for a variety of formation characteristics and drilling conditions.

Figure 3B:
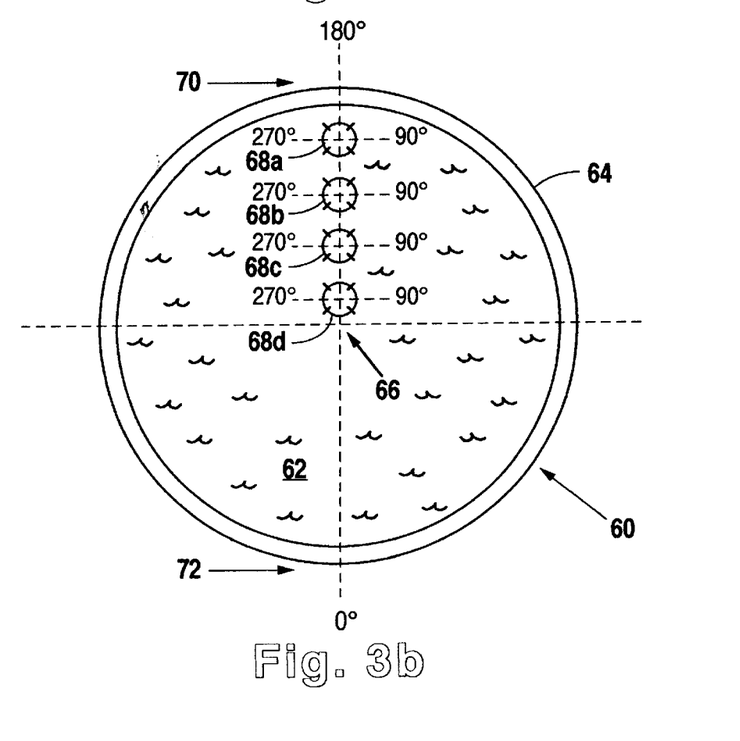
FIG. 3b is a schematic diagram of an experimental apparatus designed to measure the directional capability of a tool implementing the present invention.

Reference is now made to FIG. 3b for a description of a test apparatus implemented in conjunction with the present invention in order to demonstrate the azimuthal sensitivity of a variety of window geometries and shielding patterns. FIG. 3b shows a walled tank containing water of 0.13 ohm-m resistivity. The tool of the present invention is shown as positioned at 6, 12, 18, and 24 inches from the wall of the tank. At each position the tool was rotated through a complete 360° rotation with phase and amplitude measurements being taken at 0°, 45°, 90°, 135°, 180°, 225°, 270° and 315°. In this setup, the 0° reading was into the bulk of the tank while the 180° reading was directed towards the closest point for the wall of the tank.

Figure 4A:
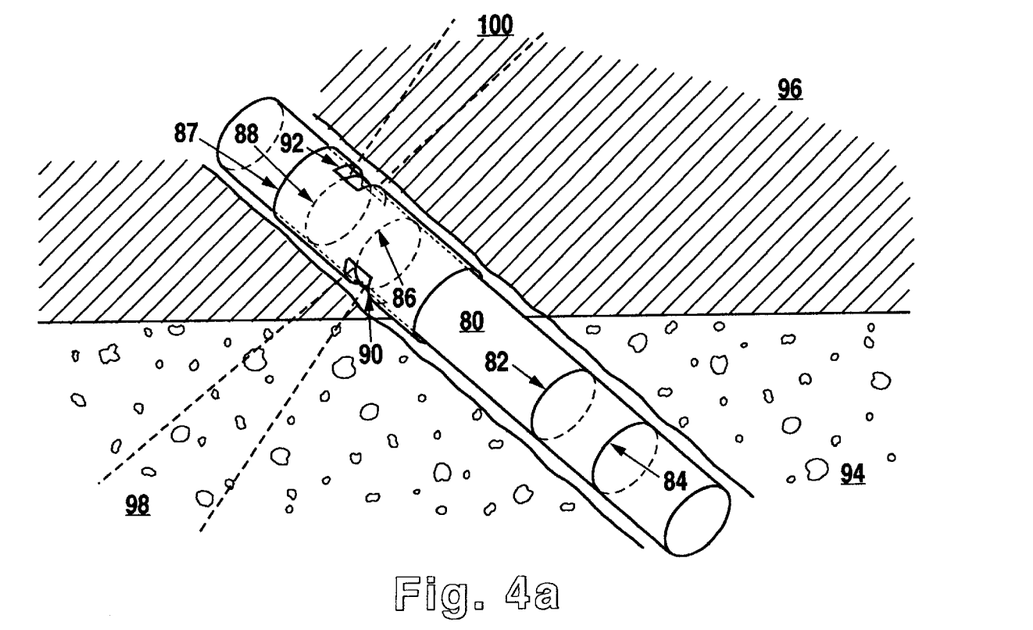
FIG. 4a is a schematic cross-sectional view of one application of the present invention in a geosteering operation.
Figure 4B:
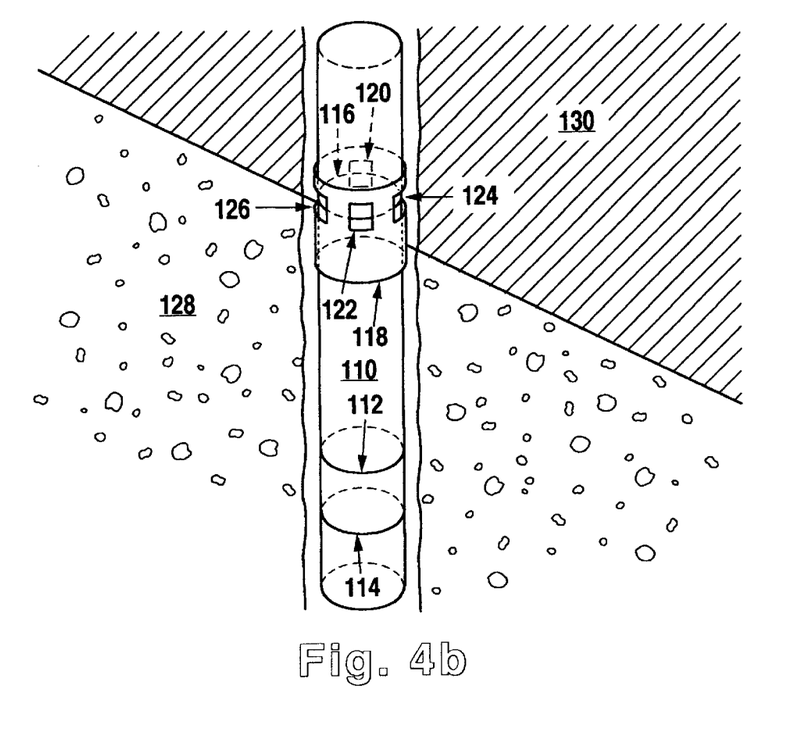
FIG. 4b is a schematic cross-sectional view of one application of the present invention in a dipmeter operation.

As indicated above, various modifications of the orientation of the windows for the shielded antennas can be implemented for the specific requirements of different applications. FIGS. 4a and 4b provide as examples two applications with different window orientations. FIG. 4a discloses a geosteering operation directing the tool to a particular zone of interest. In this case tool (80) incorporates a pair of unshielded receivers (82) and (84) operable in conjunction with a pair of shielded transmitters (86) and (88). Shield (87), positioned over transmitters (86) and (88), incorporates windows (90) and (92). In this application, window (90) is diametrically opposed (180°) from window (92). This permits a direction of investigation (100) for transmitter (88) through window (92) primarily into formation layer (96). This is contrary to the direction of investigation (98) achieved with transmitter (86) through window (90) into formation layer (94). The contrast in resistivity measurements between formations (94) and (96) identifies tool (80) as being positioned at the interface between the formations.

FIG. 4b discloses an apparatus and method for using the present invention to obtain dipmeter measurements. In this application the angle of a formation interface is measured utilizing four orthogonally placed windows surrounding a single transmitting antenna. In FIG. 4b, tool (110) incorporates unshielded receivers (112) and (114) as well as shielded transmitter (116). Shield (118) surrounding transmitter (116) incorporates orthogonally positioned windows (120), (122), (124), and (126). This system generates four separate logs each with different phase and attenuation characteristics based upon their direction into the formation interface. For example, the log derived through window (126) would be based almost entirely on characteristics of formation (128) whereas, the log deriving from window (124) would be based almost entirely on the characteristics of formation (130). Windows (120) and (122) would each generate logs appropriate to show the angle of the interface in three dimensions. In other words, even though FIG. 4b discloses a two-dimensional representation of the interface between formation (128) and (130) the orthogonal orientation of the windows on tool (110) permits the entire plane of the interface to be defined.

Further applications of the present invention implemented through various orientations of the windows positioned on the shields over transmitting and receiving antennas are anticipated. Specific structural formations surrounding the borehole such as fractures, inclusions and voids can likewise be detected with the azimuthal sensitivity of the present invention. Such azimuthal anomalies would require a slow rotation of the tool at a specific depth in order to detect the variations brought about by the formation anomalies.

As indicated above, the present invention is designed to be implemented in conjunction with existing systems capable of making measurements sensitive to radial depth into the formation from the drill string. The methods and devices associated with such measurements are adequately described in the various patents mentioned above in the description of the prior art and are not repeated here. It is sufficient to understand that appropriate methods for phase measurements and attenuation measurements can be implemented in conjunction with the azimuthal characteristics of the present invention. The following graphical figures, therefore, represent the azimuthal sensitivity of the present invention when utilized in conjunction with standard phase and attenuation measurement methods and structures as applied to the experimental tank environment shown in FIG. 3b.

Figure 5A:
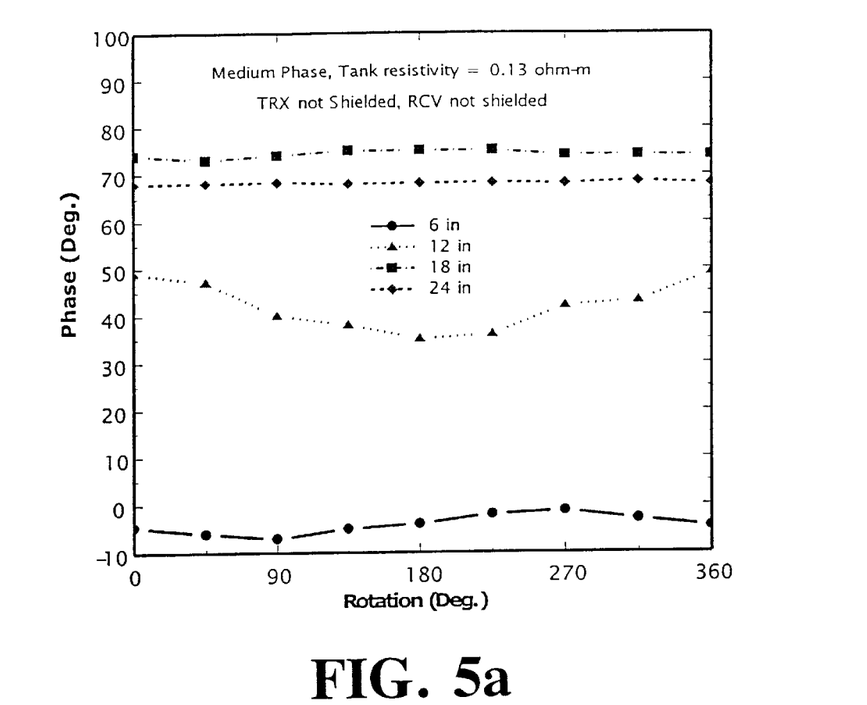
FIGS. 5a and 5b are graphical representations of data acquired for unshielded tools.

FIG. 5a provides a graphical representation of data acquired from medium phase measurements with a tank resistivity of 0.13 ohm-m when both the receiver and transmitting antennas are unshielded. FIG. 5a effectively represents, therefore, the prior art in this case. Plots of the data for each of the positions indicated in FIG. 3b, namely 6, 12, 18, and 24 inches from the tank wall are shown.

Figure 5B:
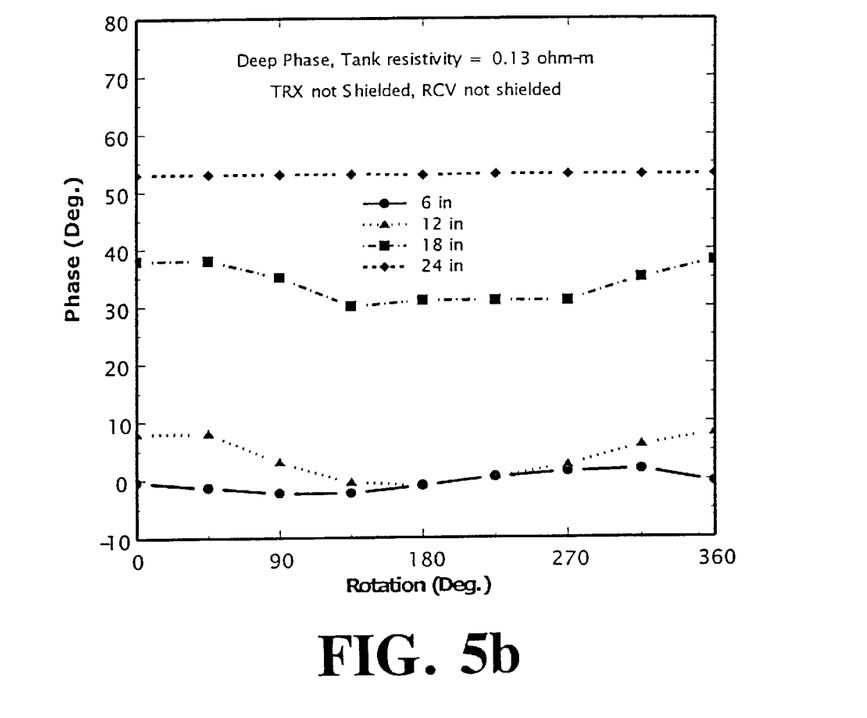

Likewise, in FIG. 5b a deep phase set of data is shown with the same parameters for tank resistivity and distance from the tank wall. The receiving and transmitting antennas in FIG. 5b were also left unshielded.

It can be seen from FIGS. 5a and 5b that the basic prior art tool utilized is slightly azimuthal already because of certain geometries in the design of the antenna structures thereon. Both the medium and deep spacings shown display a slight azimuthal sensitivity when the tool is close to the tank wall (at the 180° point in the rotation).

Figure 6A:
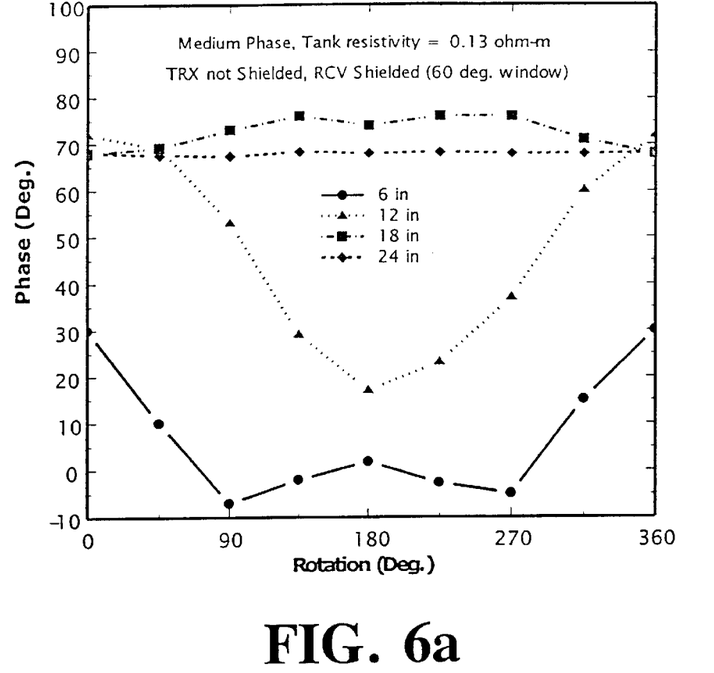
FIGS. 6a and 6b are graphical representations of data acquired with shielded receiving antennas with 60° openings.
Figure 6B:
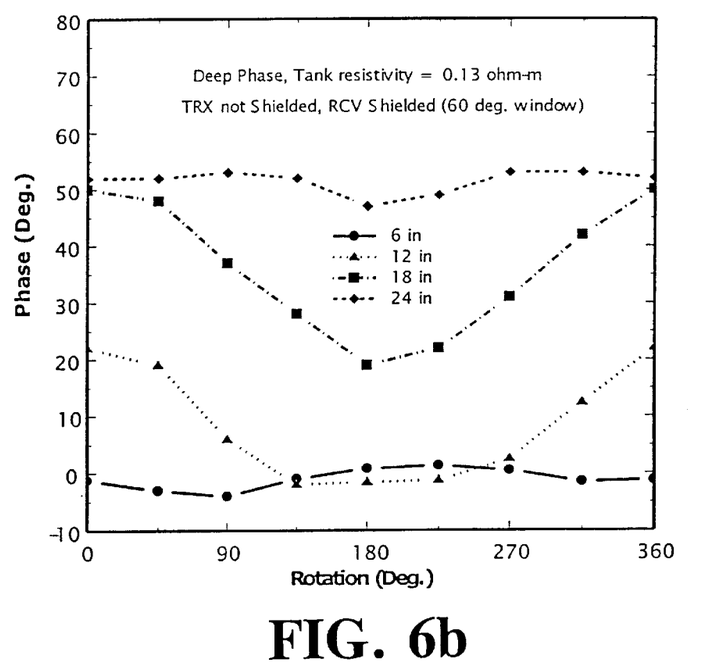

On the other hand, a dramatic sensitivity is disclosed in FIGS. 6a and 6b where the transmitting antennas are left unshielded and the receiving antennas are shielded with a 60° window opening. In FIGS. 6a and 6b the tool reads the tank water resistivity when it is away from the tank wall and begins to show azimuthal sensitivity as the rotation causes it to face the tank wall. The tool reads the tank water resistivity when facing predominately into the water (the 0° or 360° orientation) and reads the air resistivity when facing the outside of the tank (through the tank wall) at the 180° orientation. Since the deep phase shown in FIG. 6b has a deeper depth of investigation, it therefore sees the outside of the tank at a different distance from the tank wall than is displayed in FIG. 6a.

The performance of the device of the present invention can be improved under certain conditions through the use of ferrite surfaces positioned beneath the antennas. It is known in the art that positioning both transmitting and receiving antenna coils on ferrite surfaces improves the transmission and reception of electromagnetic waves to and from the surrounding formation. Essentially the ferrite surfaces boost the signal by directing more of the signal outward from the antenna. As will be seen in more detail below, the use of ferrite surfaces selectively positioned underneath the antennas improves the efficiency of the present invention under certain circumstances but is not necessary for providing a useful azimuthally sensitive system. With no ferrite beneath the antennas and with the receiver shielded except for the indicated window of 60° (as in FIGS. 6a and 6b), a loss of 12 dB occurs in air with both the medium and deep spacing.

Figure 7A:
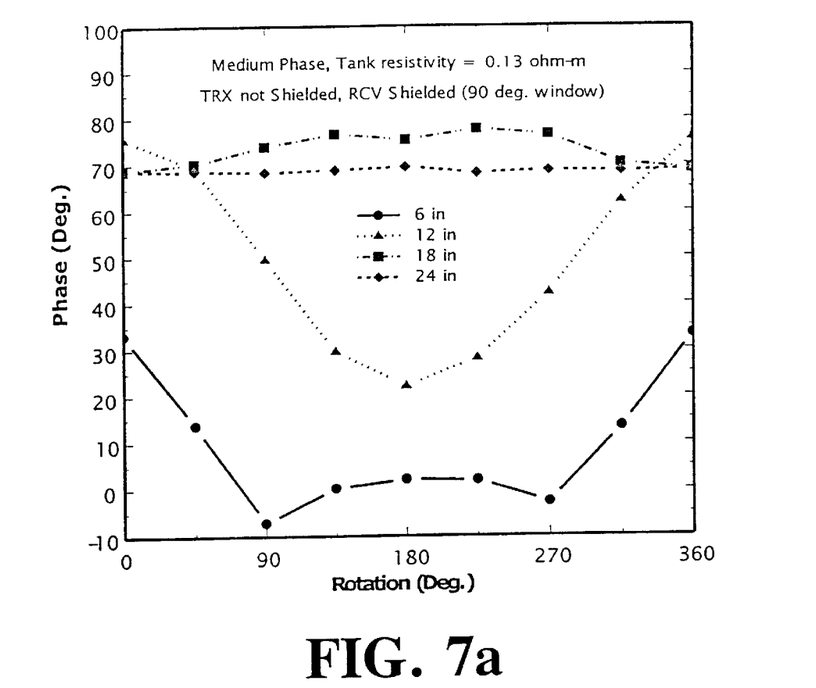
FIGS. 7a and 7b are graphical representations of data acquired with shielded receiving antennas with 90° openings.
Figure 7B:
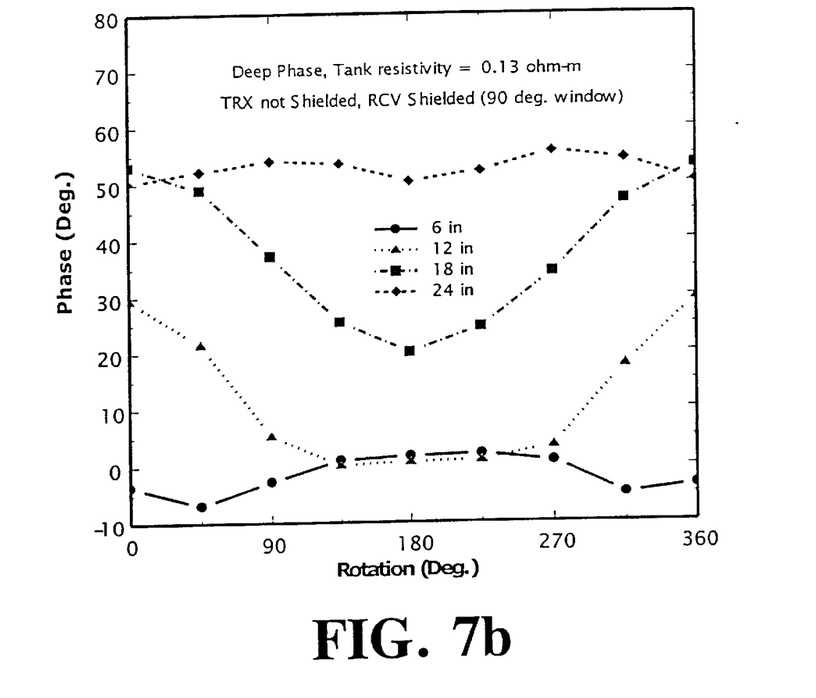
Figure 8A:
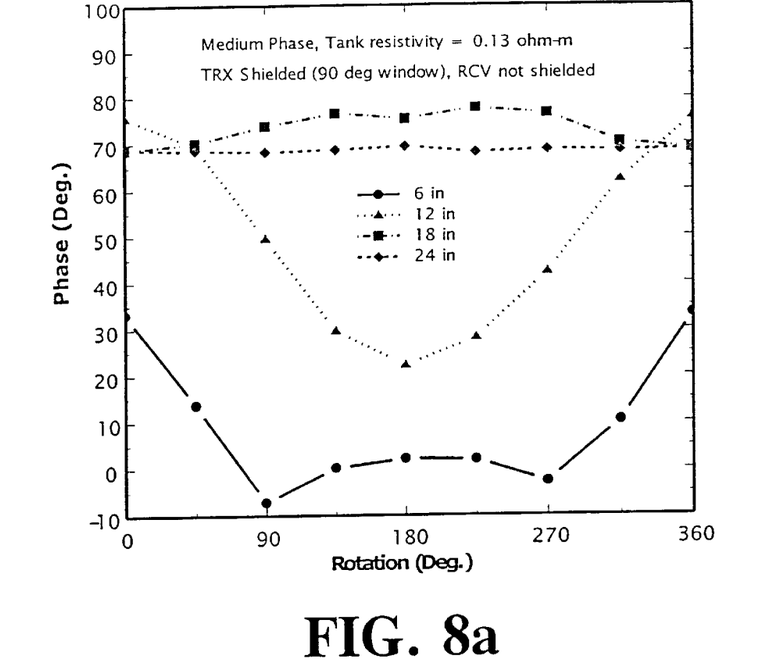
FIGS. 8a and 8b are graphical representations of data acquired with shielded transmission antennas with 90° openings and unshielded receiving antennas.
Figure 8B:
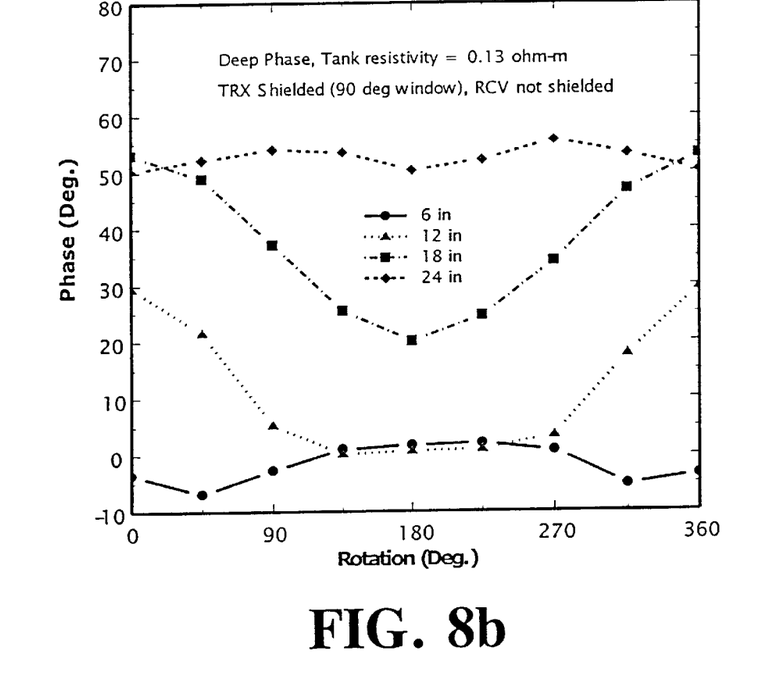
Figure 9A:
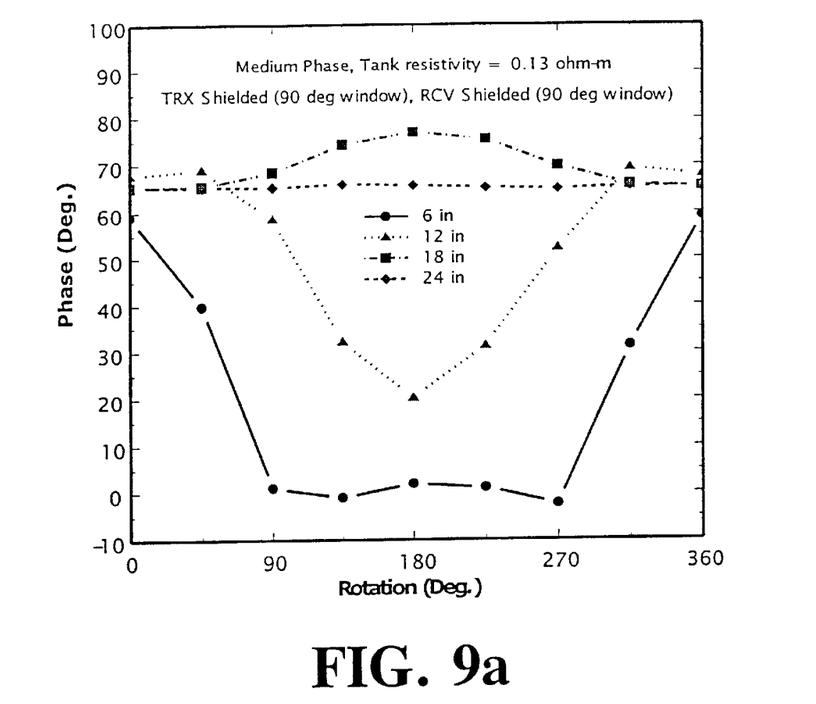
FIGS. 9a and 9b are graphical representations of data acquired with shielded transmission antennas with 90° openings and shielded receiving antennas with 90° openings.
Figure 9B:
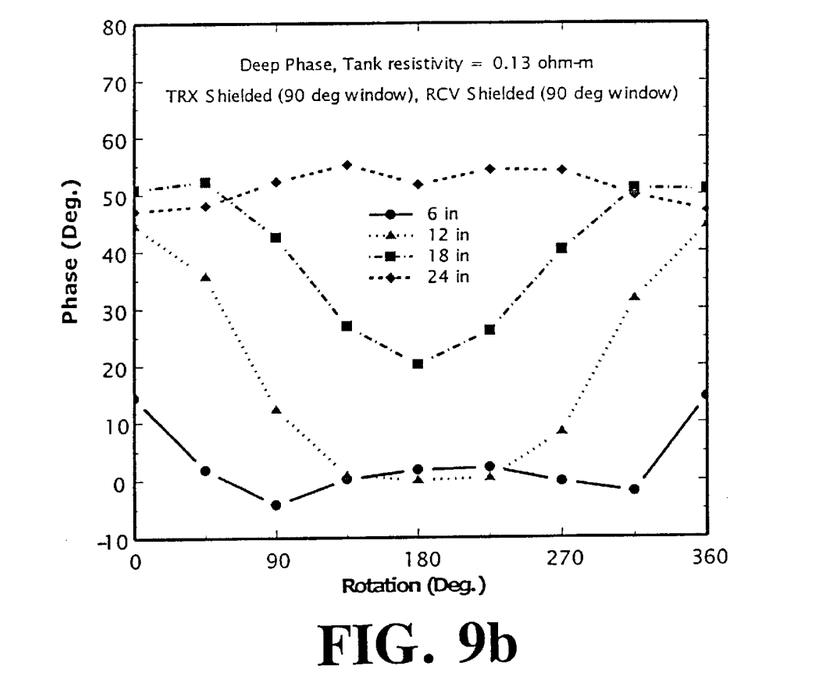
Figure 10A:
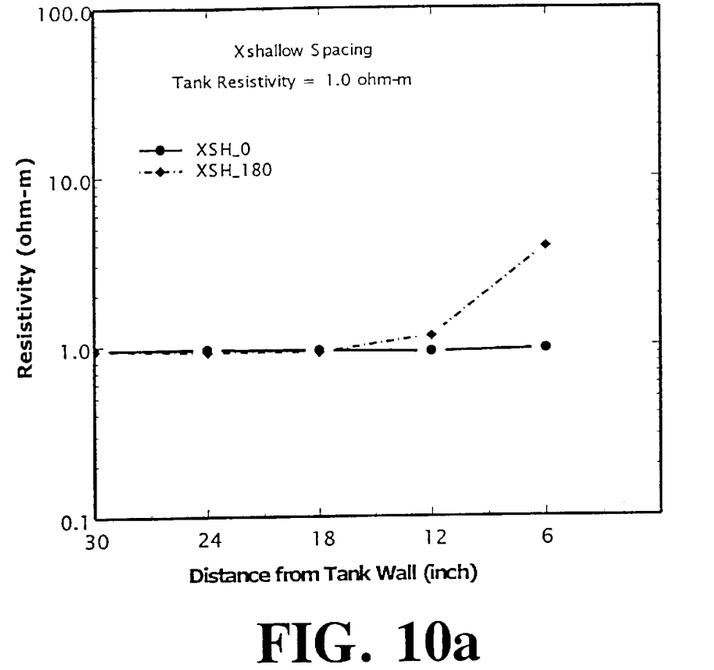
FIGS. 10a through 10d are graphical representations of resistivity measurements for a variety of radial depths with window orientations at 0° and 180°.
Figure 10B:
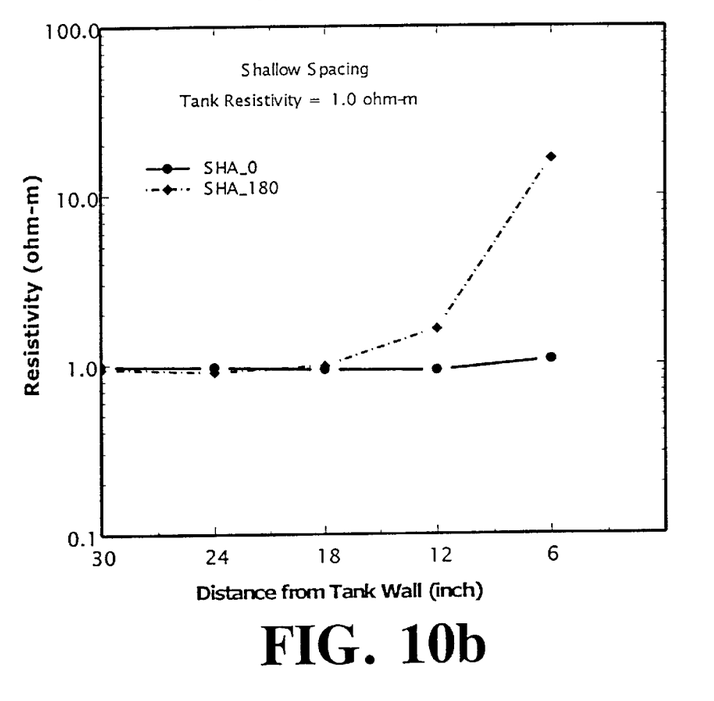
Figure 10C:
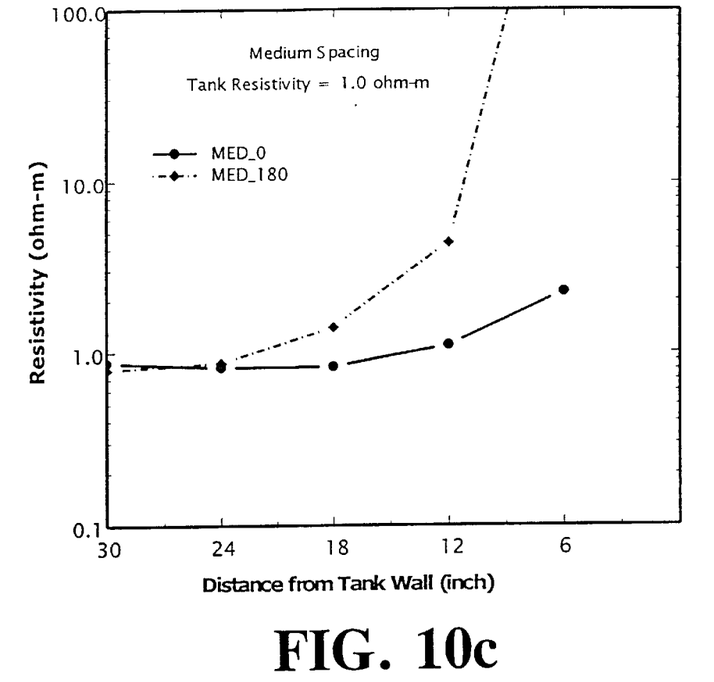
Figure 10D:
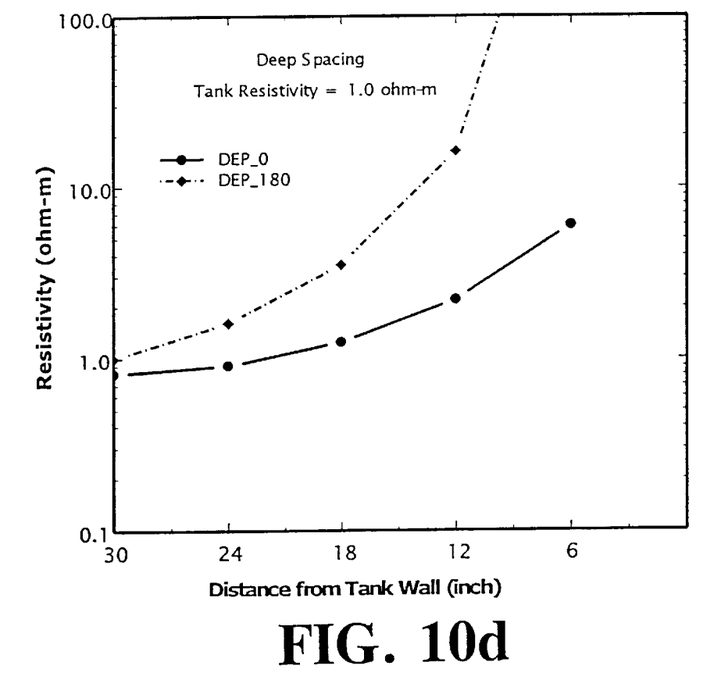

FIGS. 7a, 7b, 8a, 8b, 9a, and 9b disclose results for variations in window geometry for both shielded transmitting and shielded receiving antennas. FIGS. 7a and 7b represent data acquired with unshielded transmitting antennas in conjunction with receiving antennas shielded with 90° openings. FIGS. 8a and 8b represent data acquired with transmission antennas shielded with 90° openings and receiving antennas unshielded. FIGS. 9a and 9b represent data acquired with transmission antennas shielded with 90° openings and receiving antennas likewise shielded with 90° window openings.

These experimental results show that the smaller the window, the better the azimuthal sensitivity. As might be expected, however, the smaller the window, the greater the signal loss. For example, a receiving antenna with an opening window of 90° will show a 9 dB loss on both the medium and deep spacing. Once again, however, if a ferrite surface is positioned underneath the antenna, there is a gain of 6 dB resulting in a total loss of only 3 dB. If the apparatus involves shielding of both the receiving and transmitting antennas, each with window openings of 90° (as is shown in FIGS. 9a and 9b), the total loss is 12 dB. If ferrite surfaces are placed underneath the receivers, there is a gain of 6 dB, resulting in a total loss of 6 dB.

As indicated above, various existing improvements in the configurations of electromagnetic wave resistivity tools have permitted accurate formation resistivity measurements at various radial depths into the formation. In most instances, these methods involve the use of multiple sets of transmitters and receivers in combination and the measurement of both phase and amplitude (attenuation) parameters from the electromagnetic fields. Tests were carried out using the method and structures of the present invention in conjunction with a tool incorporating a wear band positioned on extra shallow, shallow, medium, and deep transmitting antennas operable in association with a pair of receiving antennas. The structure of such a tool is essentially that shown in FIG. 1. FIGS. 10a through 10d, as well as FIGS. 11a and 11b, represent resistivity data acquired at each of a plurality of positions spaced from the tank wall of the test apparatus (shown in FIG. 3b) for various combinations of radial depth spacing investigations.

FIGS. 10a through 10d represent data acquired for resistivity generated from extra shallow spacing, shallow spacing, medium spacing, and deep spacing, respectively. The tank resistivity in each case was 1.0 ohm-m. Two sets of measurements were made in each case, a first with the tool oriented in a direction facing inside the tank (0°) and a second with the tool oriented in a direction facing outside of the tank (180°). In each of the plots of FIGS. 10a through 10d, it can be seen that the increased resistivity of the air outside the tank is detected by the tool and is indicated by the departure of the curve for the 180° azimuth from the curve for the 0° azimuth. As would be expected, this sensitivity is most noticeable at a position close to the tank wall (6 inches in the test setup) and with the deep spacing investigation shown in FIG. 10d.

Figure 11A:
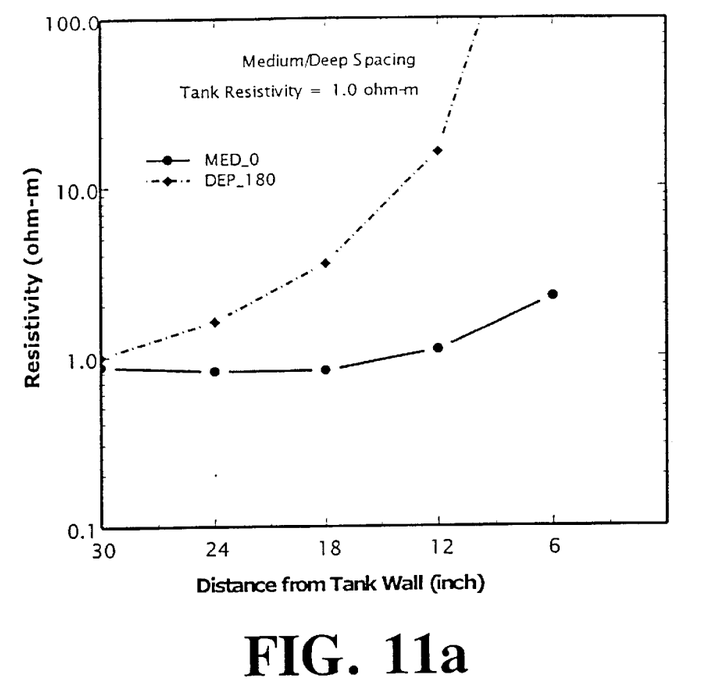
FIGS. 11a and 11b are graphical representations of resistivity measurements for a variety of radial depth combinations with window orientations at 0° for one depth and 180° for the second depth.
Figure 11B:
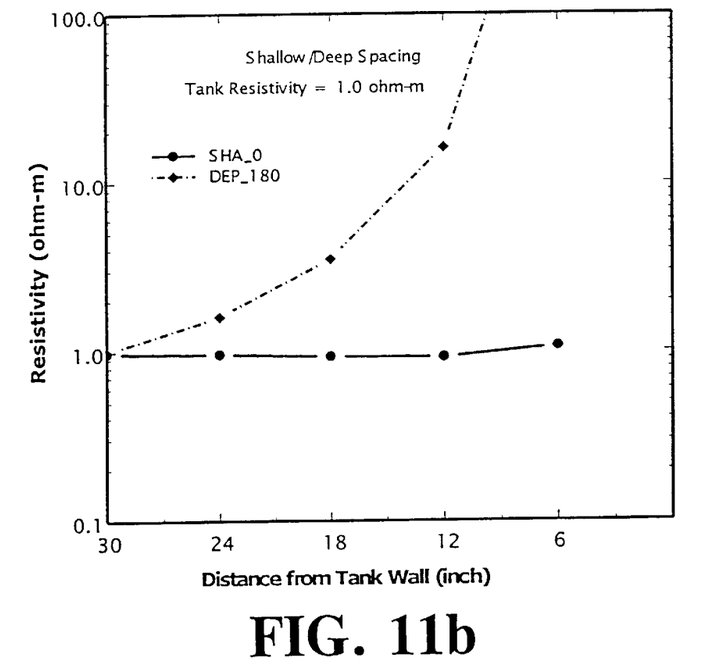

FIGS. 11a and 11b show a further application of a radial depth measurement system wherein a combination deep/medium spacing is shown in FIG. 11a and a combination deep/shallow spacing is shown in FIG. 11b. These combinations provide a greater resolution of the resistivity variations associated with the outside air of the tank, even with the tool positioned at a greater distance from the wall of the tank (18 and 24 inches, for example). In each of the examples shown in FIGS. 10a through 10d and in FIGS. 11a and 11b, the extra shallow and shallow transmitters were each shielded with an opening of 90°, while the deep transmitter, the medium transmitter, and both receiving antennas were shielded with an opening of 180°. This particular combination, one of a number of different possible configurations involving this many antennas, provides an optimal mechanism and method for azimuthally identifying formation resistivity.

While the basic structure of the present invention and its method of implementation have been described in detail above, only a few of the possible configurations anticipated have been described and identified in the data. It is anticipated that, depending upon the overall characteristics of the formation and the drilling environment, variations on these specific configurations could be applied to provide more optimal results. In general, the more permeable or conductive a formation and drilling environment tend to be, the more focused the directional geometries of the present invention can be. As with any type of interrogating signal, two basic characteristics of the signal determine its usefulness. A signal must show both high resolution and low loss in order to provide adequate data for use. If the drilling environment and the formation involved result in high signal loss, then a larger window opening may be required. In such an event, there will be some loss in resolution based upon the widening of the window, which must be taken into account in analyzing the data derived. Nonetheless, as can be seen from the data disclosed herein, even a wide window when appropriately utilized in conjunction with radial depth techniques can provide adequately sensitive azimuthal data for electromagnetic wave resistivity measurements.

Although the present invention has been described in conjunction with an application of electromagnetic wave resistivity well logging, it is anticipated that the fundamental structures and concepts of the present invention could be implemented in conjunction with a variety of other well logging techniques. The important characteristics of the present invention lie in its structural simplicity and the resulting integrities that the tool retains under otherwise adverse and harsh conditions. The design of the present invention achieves an azimuthal sensitivity without sacrificing tool ruggedness. The present invention is anticipated as being useful in both sliding or slow rotation modes.

I claim:

1. An improved well logging tool for making azimuthally sensitive resistivity measurements within a formation surrounding a drill string positioned within a borehole, said improved well logging tool comprising:

at least one transmitting antenna positioned on said drill string within said borehole, said transmitting antenna for generating a primary electromagnetic field within said surrounding formation, thereby inducing currents to flow within said formation which in turn generate a secondary electromagnetic field within said formation, said borehole, and said drill string;

at least one receiving antenna positioned on said drill string, in spaced relationship with said transmitting antenna, said receiving antenna for measuring characteristics of said secondary electromagnetic field through induction of a current within said receiving antenna indicative of said characteristics;

at least one conductive shield associated with said drill string in a manner as to partially shield said transmitting antenna or said receiving antenna or both;

wherein said conductive shield defines a window through which said primary electromagnetic field may be generated or said secondary electromagnetic field may be detected by said transmitting or receiving antennas.

2. The improved well logging tool of claim 1 wherein said at least one conductive shield comprises:

a conductive shield positioned on said at least one transmitting antenna.

3. The improved well logging tool of claim 1 wherein said at least one conductive shield comprises:

a conductive shield positioned on said at least one receiving antenna.

4. The improved well logging tool of claim 1 wherein said at least one conductive shield comprises:

a first conductive shield partially shielding said at least one transmitting antenna; and a second conductive shield partially shielding said at least one receiving antenna.

5. The improved well logging tool of claim 1 wherein said at least one conductive shield defines a window having an opening in the range of approximately 30° to approximately 90°.

6. The improved well logging tool of claim 1 wherein said at least one conductive shield defines a window having an opening in the range of approximately 90° to approximately 180°.

7. The improved well logging tool of claim 1 wherein said at least one transmitting antenna and said at least one receiving antenna comprise wire coils positioned concentrically around a longitudinal axis of said tool.

8. An improved well logging tool for making azimuthally sensitive resistivity measurements within a formation surrounding a drill string positioned within a borehole, said improved well logging tool comprising:

a plurality of transmitting antenna coils positioned on said drill string, said transmitting antenna coils for generating primary electromagnetic fields within said surrounding formation, thereby inducing currents to flow within said formation which in turn generate secondary electromagnetic fields within said formation, said borehole, and said drill string;

a plurality of receiving antenna coils positioned on said drill string in spaced relationship with said transmitting antenna coils and with each other, said plurality of receiving antenna coils for measuring characteristics of said secondary electromagnetic fields through induction of a current within said receiving antenna coils indicative of said characteristics;

a conductive shield positioned on said drill string in such a manner as to partially shield at least one of said transmitting antenna coils; and a conductive shield positioned on said drill string in such a manner as to partially shield at least one of said receiving antenna coils;

wherein said conductive shields define windows through which said primary electromagnetic fields may be generated or said secondary electromagnetic fields may be detected by said transmitting or receiving antennas.

9. The improved well logging tool of claim 8 wherein said conductive shield partially shielding at least one of said transmitting antenna coils is oriented in a first azimuthal direction, and said conductive shield partially shielding at least one of said antenna coils is also oriented in said first azimuthal direction.

10. The improved well logging tool of claim 8 wherein said conductive shield partially shielding at least one of said transmitting antenna coils is oriented in a first azimuthal direction and said conductive shield partially shielding at least one of said receiving antenna coils is oriented in a second azimuthal direction, said second azimuthal direction differing from said first azimuthal direction by at least 90°.

11. The improved well logging tool of claim 10 wherein said second azimuthal direction differs from said first azimuthal direction by approximately 180°.

12. An improved method for well logging, the improvement being a method for making azimuthally sensitive resistivity measurements within a formation surrounding a drill string positioned within a borehole, said improved method comprising the steps of:

positioning at least one transmitting antenna coil on said drill string;

directing a current to flow within said transmitting antenna coil so as to generate a primary electromagnetic field within said surrounding formation, thereby inducing currents to flow within said formation which currents in turn generate a secondary electromagnetic field within said formation, said borehole, and said drill string;

positioning at least one receiving antenna coil on said drill string in spaced relationship with said at least one transmitting antenna coil;

positioning at least one conductive shield over said transmitting antenna coil or said receiving antenna coil, said conductive shield defining at least one window through which said secondary electromagnetic field may be detected by said receiving antenna coil or said primary electromagnetic field may be generated by said transmitting antenna coil;

measuring characteristics of said secondary electromagnetic field through induction of a current within said receiving antenna coil indicative of said characteristics; and orienting said at least one window of said conductive shield in plurality of azimuths and repeating said step of measuring characteristics of said secondary electromagnetic fields at each of said azimuths.

13. The improved method for well logging of claim 12 wherein:

said step of positioning at least one receiving antenna coil on said drill string comprises positioning first and second receiving antenna coils in first and second positions on said drill string;

said step of positioning at least one transmitting antenna coil on said drill string comprises positioning a first transmitting antenna coil in a third position on said drill string and a second transmitting antenna coil in a fourth position on said drill string; and wherein a mid point between said first and second positions on said drill string is displaced a first distance from said third position on said drill string and a second distance from said fourth position on said drill string, said second distance being greater than said first distance, wherein a combination of said first transmitting antenna coil and said first and second receiving antenna coils provides a first depth of investigation into said surrounding formation, and a combination of said second transmitting antenna coil with said first and second receiving antenna coils provides a second depth of investigation into said surrounding formation, said second depth of investigation being greater than said first depth of investigation.

14. The improved method for well logging of claim 12 wherein:

said step of positioning at least one receiving antenna coil on said drill string comprises positioning first and second receiving antenna coils in first and second positions on said drill string;

said step of positioning at least one transmitting antenna coil on said drill string comprises positioning a first transmitting antenna coil in a third position on said drill string, a second transmitting antenna coil in a fourth position on said drill string, and a third transmitting antenna coil in a fifth position on said drill string; and wherein a mid point between said first and second positions on said drill string is displaced a first distance from said third position on said drill string, a second distance from said fourth position on said drill string and a third distance from said fifth position on said drill string, said third distance being greater than said second distance and said second distance being greater than said first distance, wherein a combination of said first transmitting antenna coil and said first and second receiving antenna coils provides a first depth of investigation into said surrounding formation, a combination of said second transmitting antenna coil with said first and second receiving antenna coils provides a second depth of investigation into said surrounding formation, and a combination of said third transmitting antenna coil with said first and second receiving antenna coils provides a third depth of investigation into said surrounding formation, said third depth of investigation being greater than said second depth of investigation and said second depth of investigation being greater than said first depth of investigation.

15. The improved method for well logging of claim 12 wherein:

said step of positioning at least one receiving antenna coil on said drill string comprises positioning first and second receiving antenna coils in first and second positions on said drill string;

said step of positioning at least one transmitting antenna coil on said drill string comprises positioning a first transmitting antenna coil in a third position on said drill string, a second transmitting antenna coil in a fourth position on said drill string, a third transmitting antenna coil in a fifth position on said drill string, and a fourth transmitting antenna coil in a sixth position on said drill string; and wherein a mid point between said first and second positions on said drill string is displaced a first distance from said third position on said drill string, a second distance from said fourth position on said drill string, a third distance from said fifth position on said drill string, and a fourth distance from said sixth position on said drill string, said fourth distance being greater than said third distance, said third distance being greater than said second distance, and said second distance being greater than said first distance wherein a combination of said first transmitting antenna coil and said first and second receiving antenna coils provides a first depth of investigation into said surrounding formation, a combination of said second transmitting antenna coil with said first and second receiving antenna coils provides a second depth of investigation into said surrounding formation, a combination of said third transmitting antenna coil with said first and second receiving antenna coils provides a third depth of investigation into said surrounding formation, and a combination of said fourth transmitting antenna coil with said first and second receiving antenna coils provides a fourth depth of investigation into said surrounding formation, said fourth depth of investigation being greater than said third depth of investigation, said third depth of investigation being greater than said second depth of investigation, and said second depth of investigation being greater than said first depth of investigation.

16. The improved method for well logging of claim 12 wherein said step of positioning at least one conductive shield comprises positioning a first conductive shield over at least one transmitting antenna coil in a first azimuthal direction and positioning a second conductive shield over at least one receiving antenna coil also in said first azimuthal direction.

17. The improved method for well logging of claim 12 wherein said step of positioning at least one conductive shield comprises positioning a first conductive shield over at least one transmitting antenna coil in a first azimuthal direction and positioning a second conductive shield over at least one receiving antenna coil in a second azimuthal direction, said first azimuthal direction differing from said second azimuthal direction by at least 90°.

18. The improved method for well logging of claim 12 wherein said step of positioning at least one conductive shield comprises positioning a conductive shield defining a plurality of windows through which electromagnetic waves may be received by said receiving antenna coils or propagate from said transmitting antenna coils, said plurality of windows being directed in a plurality of distinct azimuths.

* * * * *